US012687223B2

(12) United States Patent
Székely

(10) Patent No.: US 12,687,223 B2
(45) Date of Patent: Jul. 21, 2026

(54) DRIVE DEVICE FOR A MOTOR VEHICLE, SAID DRIVE DEVICE COMPRISING A MULTI-FUNCTIONAL CLOSURE COVER

(71) Applicant: AUDI AG, Ingolstadt (DE)

(72) Inventor: Béla Székely, Györ (HU)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/697,097

(22) PCT Filed: Sep. 28, 2022

(86) PCT No.: PCT/EP2022/076995
§ 371 (c)(1),
(2) Date: Mar. 29, 2024

(87) PCT Pub. No.: WO2023/052432
PCT Pub. Date: Apr. 6, 2023

(65) Prior Publication Data
US 2024/0410463 A1 Dec. 12, 2024

(30) Foreign Application Priority Data

Sep. 29, 2021 (DE) .......................... 102021125199.0

(51) Int. Cl.
*F16H 57/04* (2010.01)
*F16H 57/02* (2012.01)
(Continued)

(52) U.S. Cl.
CPC ....... *F16H 57/0424* (2013.01); *F16H 57/031* (2013.01); *F16H 57/032* (2013.01);
(Continued)

(58) Field of Classification Search
CPC ............... F16H 57/031; F16H 57/0424; F16H 57/0434; F16H 57/0436; F16H 57/0441; F16H 57/045
See application file for complete search history.

(56) References Cited

U.S. PATENT DOCUMENTS 5,522,476 A * 6/1996 Holman .............. F16H 57/0456
184/6.12
5,544,540 A * 8/1996 Holman .............. F16H 57/0493
184/6.12
(Continued)

FOREIGN PATENT DOCUMENTS

CN 1847682 A 10/2006
CN 210196418 U 3/2020
(Continued)

OTHER PUBLICATIONS

Examination Report issued on May 11, 2022, in corresponding German Application No. 102021125199.0, 8 pages.
(Continued)

*Primary Examiner* — Minh Truong
(74) *Attorney, Agent, or Firm* — Maier & Maier, PLLC

(57) ABSTRACT

A drive device for a motor vehicle. In particular a machine housing in which a lubricant consumer, a lubricant tank and a lubricant pump are arranged. The lubricant pump is fluidically connected on the suction side via a suction channel to the lubricant consumer and on the pressure side via a pressure channel to the lubricant tank and the lubricant tank is fluidically connected to the lubricant consumer via a flow channel. The suction channel, the pressure channel and the flow channel are each formed open with an opening in a base body of the machine housing and the openings are covered fluidically separate from one another by an end cover attached to the base body.

19 Claims, 2 Drawing Sheets

(51) Int. Cl.
| | |
|---|---|
| *F16H 57/031* | (2012.01) |
| *F16H 57/032* | (2012.01) |

(52) U.S. Cl.
CPC ....... *F16H 57/0436* (2013.01); *F16H 57/045* (2013.01); *F16H 2057/02034* (2013.01); *F16H 2057/02043* (2013.01); *F16H 57/0476* (2013.01)

(56) References Cited

U.S. PATENT DOCUMENTS

| | | | |
|---|---|---|---|
| 8,409,041 B2 | | 4/2013 | Tryon |
| 9,404,381 B2 | * | 8/2016 | NguyenLoc ........ F16H 57/0441 |
| 11,215,078 B2 | * | 1/2022 | Menczykalski ......... F01D 25/20 |
| 12,098,766 B2 | * | 9/2024 | Greiter ................ F16H 57/0445 |
| 2011/0076165 A1 | | 3/2011 | Atarashi et al. |
| 2011/0298314 A1 | | 12/2011 | Atarashi et al. |
| 2016/0369853 A1 | * | 12/2016 | Sugiura .................... F01M 1/10 |
| 2017/0219083 A1 | * | 8/2017 | Ito ........................ F16H 57/0423 |
| 2017/0284510 A1 | | 10/2017 | Iwaki et al. |
| 2022/0356941 A1 | * | 11/2022 | Böhm ................. F16H 57/0476 |

FOREIGN PATENT DOCUMENTS

| | | | | |
|---|---|---|---|---|
| CN | 111561446 A | * | 8/2020 | ............. F04C 2/344 |
| DE | 3209514 A1 | | 9/1983 | |
| DE | 102019128957 A1 | | 4/2021 | |
| EP | 3763971 A1 | | 1/2021 | |
| JP | 201911824 A | | 1/2019 | |

OTHER PUBLICATIONS

International Preliminary Report on Patentability issued on Apr. 11, 2024, in corresponding International Application No. PCT/EP2022/076995, 21 pages.

* cited by examiner

DRIVE DEVICE FOR A MOTOR VEHICLE, SAID DRIVE DEVICE COMPRISING A MULTI-FUNCTIONAL CLOSURE COVER

FIELD

The invention relates to a drive device for a motor vehicle.

BACKGROUND

The prior art is known, for example, from CN 210196418 U. This describes a lubricant system for a gearbox device.

SUMMARY

The object of the invention is to propose a drive device for a motor vehicle which has advantages over known drive devices, in particular enables cost effective and rapid manufacture.

According to the invention, this object is achieved with a drive device for a motor vehicle. In particular, a machine housing is provided in which a lubricant consumer, a lubricant tank and a lubricant pump are arranged, wherein the lubricant pump is connected on the suction side via a suction channel to the lubricant consumer and on the pressure side via a pressure channel to the lubricant tank and the lubricant tank is connected to the lubricant consumer via a flow channel, wherein the suction channel, the pressure channel and the flow channel are each designed open in a base body of the machine housing, forming an opening, and the openings are closed fluidically separate from each other by means of an end cover attached to the base body.

The drive device is used to drive the motor vehicle, thus for the provision of a drive torque for driving the motor vehicle. For this purpose, the drive device preferably has a drive unit, which is at least temporarily drivingly coupled to at least one wheel of the motor vehicle. The drive unit is preferably at least partially arranged in the machine housing or accommodated by the machine housing. For example, the drive unit is in the form of an electric machine which is at least temporarily operated as an electric motor.

The lubricant consumer, the lubricant tank and the lubricant pump are arranged in the machine housing. For example, the lubricant consumer is in the form of the drive unit and/or a gearbox. During operation of the drive unit, the lubricant consumer is supplied with lubricant at least temporarily. The lubricant is used to lubricate and/or thermally regulate the lubricant consumer. The term "lubricant consumer" does not mean that the lubricant consumer actually consumes the lubricant. Rather, the lubricant consumer receives the lubricant in particular at a lubricant inlet, and subsequently provides it again, at least for the most part, preferably at a lubricant outlet.

The lubricant supplied to the lubricant consumer is removed from the lubricant tank, which is provided and designed to temporarily store the lubricant. After the lubricant is supplied to the consumer, it is returned to the lubricant tank, namely with the aid of the lubricant pump. This means that the lubricant pump is provided and designed to supply the lubricant provided by the lubricant consumer in the direction of the lubricant tank or into the lubricant tank.

Preferably, there is at least one further lubricant pump by means of which the lubricant is removed from the lubricant tank and conveyed in the direction of the lubricant consumer or is supplied to the lubricant consumer. In this case, for example, the lubricant pump and the further lubricant pump can be operated independently of each other, so that the lubricant is fed to the lubricant tank by means of the lubricant pump and is fed from the lubricant tank in the direction of the consumer by the further lubricant pump. Preferably, however, the lubricant pump and the further lubricant pump are preferably operated together. In particular they are driven by a common drive.

On the one hand, the lubricant pump is connected to the lubricant consumer via the suction channel. This means that the lubricant pump supplies the lubricant from the lubricant consumer or its lubricant outlet via the suction channel in the direction of the lubricant tank. On the other hand, the lubricant pump is connected to the lubricant tank via the pressure channel. Via the suction channel, the lubricant pump sucks in the lubricant from the direction of the lubricant consumer and feeds it via the pressure channel in the direction of the lubricant the lubricant tank or into the same.

Both the suction channel and the pressure channel are preferably connected directly to the lubricant pump, and thus extend in the flow direction from the same pump. It is also possible that the suction channel extends to the lubricant outlet of the lubricant consumer and the pressure channel extends as far as the lubricant tank. Preferably however, the suction channel extends from the lubricant outlet and the pressure channel is arranged at a distance from the lubricant tank so that they only partially extend as far as the respective element.

The lubricant tank and the lubricant consumer are fluidically connected to each other via the flow channel. Therefore the flow channel is present along a fluid connection between the lubricant tank and the lubricant consumer. It may be provided that the flow channel starts immediately before the lubricant tank and extends to the lubricant consumer. However, it may be provided that the flow channel is fluidically separated either from the lubricant tank or the lubricant consumer or from both, thus only forms part of the fluid connection.

The suction channel, the pressure channel and the flow channel are each formed at least partially in the machine housing. For each of the channels there is a corresponding recess in the machine housing which is open via the respective opening. In this respect, the opening represents a mouth, through which the respective channel or the respective recess initially opens into an external environment of the base body, namely as long as the end cover is not attached to the base body, i.e. when the end cover is not fastened to the base body. In other words, the recesses are open in the direction of the end cover and have their respective opening there. The recesses in the machine housing, i.e. the suction channel, the pressure channel and the flow channel, are preferably produced during a casting process of the machine housing. In this case, the machine housing is provided as a cast part.

It is possible that the recesses only form part of the channels. For example, a portion of the respective channel opens into the corresponding recess in the machine housing. In particular, it may be provided that a first portion of one of the channels opens into the recess at a first point and a second portion opens from the recess at a second point which is at a distance from the first, so that the two portions are fluidically connected to each other or are in mutual fluid connection. The portion or at least one of the portions of the respective channel is preferably also formed during the casting process or is alternatively designed as a bore.

As already explained, the channels or recesses are initially open in the machine housing. For this reason, the end cover is attached to the base body in such a way that the openings are completely overlapped and thus covered or tightly closed. By means of the end cover, the channels are therefore covered separately from each other in terms of flow. This means in particular that the channels are not in fluid connection with each other via their openings, but that such a flow connection is interrupted by the end cover.

The end cover serves to cover or close the openings at the same time, so that only a single element, namely the end cover, needs to be attached to the base body for completing the channels. It is therefore not necessary to attach and/or fasten different elements separately on the machine housing. This enables a particularly fast production of the drive unit and also significantly simplifies the assembly of the drive unit.

The end cover is particularly preferably screwed to the machine housing, i.e. attached to it by means of at least one screw or bolt. This ensures a reliable and permanently tight cover or closure of the openings using the end cover. Overall, it is easily possible for the drive device described to form the channels initially in a particularly simple manner in the machine housing, at least partially in particular during a casting process in which the machine housing is produced.

Subsequently, the end cover is arranged on the base body and fastened thereto to cover or close the openings of the channels or recesses. The arrangement of the end cover ensures that the multiple channels are realized or completed at the same time. The end cover thus delimits the channels at least in certain regions or represents a flow-guiding element for the channels.

A further development of the invention provides that the lubricant pump on the suction side is connected parallel to the suction channel to a further suction channel and via this fluidically to the lubricant consumer and/or a further lubricant consumer. In addition to the suction channel, the drive unit therefore has the further suction channel. The lubricant pump is also fluidically connected to the lubricant consumer via the further suction channel in the same way as via the suction channel. Additionally or alternatively, a flow connection between the lubricant pump and the further lubricant consumer is established.

For example, the drive unit is the lubricant consumer and the gearbox is the other lubricant consumer or vice versa. Via the suction channels, i.e. the suction channel and the further suction channel, lubricant is supplied from the lubricant consumer or the lubricant consumers towards the lubricant tank, in particular into the lubricant tank. The further suction channel is designed in the same way as the suction channel. This means that the further suction channel is formed open with an opening in the base body of the machine housing. The opening is covered or closed by means of the end cover, wherein this covering or closing of the opening of the further suction channel and the openings of the suction channel, the pressure channel and the flow channel occurs in a fluidically separate manner. This design of the drive unit and, in particular, the machine housing allows a high degree of integration and at the same time ensures rapid assembly. This leads to cost-effective manufacture of the drive unit.

A further development of the invention provides that the lubricant consumer and/or the further lubricant consumer are each present as one of the following devices: drive unit and gearbox. The drive device preferably has—as already explained—the drive unit. In addition or as an alternative to the drive unit, the drive device has the gearbox. The gearbox has at least one gear stage, preferably several gear stages connected in series. A gearbox input shaft is connected to a gearbox output shaft via the gearbox stage or gearbox stages. Preferably, a fixed gearbox ratio between the input shaft and the output shaft is set by means of the one or multiple gear stages. The gearbox input shaft is preferably connected to the drive unit in particular in a rigid and/or permanent manner. The gearbox output shaft, on the other hand, is coupled to the at least one wheel of the motor vehicle or can at least can be coupled thereto. For example, the drive unit has a clutch. This can, for example, be drivingly connected between the gearbox output shaft and the at least one wheel of the vehicle.

Both the drive unit and the gearbox must be supplied with lubricant during their operation, on the one hand for lubrication and on the other hand for temperature control. In this respect, for example, the drive unit is the lubricant consumer and the gearbox is the other lubricant consumer. This means that lubricant taken from the lubricant tank is supplied to the drive unit and/or the gearbox during operation of the drive unit, which is subsequently pumped from the drive unit and/or the gearbox via the suction channel by means of the lubricant pump and returned to the lubricant tank. Such an arrangement requires a large number of channels in the machine housing, which are particularly easy and inexpensive to produce by using the end cover.

A further development of the invention provides for the suction channel to be fluidically connected via a lubricant sump to the lubricant consumer and/or the other suction channel via the lubricant sump to the further lubricant consumer. The lubricant sump is located between the lubricant consumer and the suction channel or between the further lubricant consumer and the further suction channel. Lubricant exiting from the lubricant consumer or the further lubricant consumer thus initially enters the lubricant sump and is discharged from this with the aid of the suction channel and/or the further auction, namely in the direction of the lubricant tank.

For example, the lubricant consumer and the further lubricant consumer or their lubricant outlets are fluidically connected to the same lubricant sump. However, it is also possible that the suction channel is connected via the lubricant sump to the lubricant consumer and the other suction channel is connected via another lubricant sump to the further lubricant consumer, wherein the lubricant sump and the further lubricant sump are fluidically separated from each other or are connected to each other only through the channels, the lubricant tank, the lubricant pump and the lubricant consumers. This avoids a direct connection of the suction channel to the lubricant consumer and the further suction channel to the further lubricant consumer. At the same time, reliable delivery of the lubricant is ensured from the lubricant consumers in the direction of the lubricant tank.

A further development of the invention provides that the end cover for covering the openings rests against the edges delimiting the openings, which lie completely in an imaginary plane. The openings are bounded by the edges. Preferably, the edges surround each of the openings continuously, so that the openings are closed at the edges. The edges are preferably free ends of webs, between which the channels or the recesses of the channels are formed. The edges lie completely in the imaginary plane. This should be understood to mean that the edges are continuously flat and aligned with each other. In particular, the edges form sealing surfaces against which the end cover for covering or closing the openings rests in a fluid-tight manner.

For example, seals are arranged between the end cover and the edges, which respectively continuously surround one of the openings. For example, the seals are attached to the end cover and/or are formed in one piece with it. Alternatively, the seals can also be attached to the base body. The arrangement of the edges in the imaginary plane has the advantage that the end cover can be used to essentially simultaneously cover or close the openings by means of the cover and in addition, the production of the end cover and/or the arrangement of the seals can be accomplished in a simple manner.

A further development of the invention provides for the end cover to consist of a material that is different from a material of the base body of the machine housing. In this respect, the end cover and the machine housing or its base body are made of a different material. The material of the base body is, for example, metal, in particular aluminum or steel or a corresponding alloy. The material of the end cover is in particular a plastic, especially a thermoplastic. In this case, the aforementioned seal can be formed in one piece with the end cover; for example by molding. This ensures simple and cost-effective production.

A further development of the invention provides that a pressure chamber of the end cover fluidically connected to the pressure channel via the corresponding opening is fluidically connected via a connection opening formed in the end cover with the lubricant tank, so that the lubricant pump is connected to the lubricant tank via the pressure channel formed in the base body and the connection opening and/or that a suction chamber of the end cover fluidically connected to the suction channel and/or the further suction channel via the corresponding opening is fluidically connected to the lubricant tank via a passage opening formed in the end cover, so that the lubricant pump is fluidically connected to the lubricant outlet via the suction channel formed in the base body and the passage opening For example, the pressure chamber which is formed in the end cover is present in it as a recess open in the direction of the base body. The pressure chamber or an opening of the pressure chamber facing the machine housing is aligned with the pressure channel or the opening of the pressure channel so that the pressure channel is fluidically connected to the pressure chamber. The pressure chamber is fluidically connected to the pressure channel on the one hand and to the lubricant tank on the other. In other words, the pressure channel is connected to the lubricant tank via the pressure chamber. For this purpose the connection opening is formed in the end cover. Overall, this results in a design of the drive unit in which the lubricant pump is fluidically connected to the lubricant tank via the pressure channel and the connection opening—in this exact order. This enables a structurally simple design of the drive unit and a flexible arrangement of the lubricant tank.

In addition or as an alternative to the pressure chamber, the suction chamber is located in the end cover. For the suction chamber, the explanations for the pressure chamber apply analogously. It is also present as a recess in the end cover which has an opening on its side facing the base body of the machine housing and is correspondingly open. The suction chamber or the opening is aligned with the suction channel or the further suction channel and the opening corresponding to the opening of the suction channel or the further suction channel. Consequently, the suction chamber is fluidically connected to the suction channel or the further suction channel.

On its side facing away from the suction channel or the further suction channel the suction chamber is fluidically connected to the lubricant tank, namely via the passage opening, which is formed in the end cover. The drive unit is designed in such a way that the lubricant pump is fluidically connected to the lubricant outlet via the suction channel and the passage opening, again in this order. Once again, this enables a structurally simple and at the same time flexible design.

A further development of the invention provides for the end cover to be arranged in an air space into which at least one machine shaft of the drive unit extends and/or is delimited by a wall of the base body and by a machine housing cover attached to the base body. The air space is at least partially enclosed by the machine housing. Particularly preferred the air space is sealed off from the outside environment in a fluid-tight manner. Preferably, the machine housing cover is attached to the base body in a fluid-tight manner so that the air space is enclosed on the one hand by the base body or its wall and by the machine housing cover on the other in particular in the axial direction of the machine shaft.

Additionally or alternatively, the machine shaft of the drive device is present in the air space, at least in some areas. The machine shaft is, for example part of the drive unit, in particular it represents a drive shaft of the drive unit. For example, the machine shaft has a toothing in the air space, via which it is connected to at least one other shaft of the drive unit. For example, the toothing serves to fix a gear wheel in relation to the machine shaft in the circumferential direction. For this purpose, the gear wheel has a mating toothing which interacts positively with the toothing of the machine shaft. The use of the end cover/end covers enables effective utilization of the air space and a correspondingly compact design of the machine housing.

A further development of the invention provides for the connection opening to be fluidically connected to the lubricant tank via a lubricant line attached to the end cover, wherein the lubricant line extends through a partition wall delimiting the air space and/or partially extends through the lubricant tank. The lubricant line is in the form of a rigid tube, for example. It is attached to the end cover in such a way that it is fluidically connected to the connection opening and via this to the pressure chamber of the end cover. Ultimately, the lubricant line is therefore in flow connection with the pressure channel.

The lubricant line extends all the way to the lubricant tank. For example, it ends directly at the lubricant tank. Preferably, however, it is provided that it extends partially through the lubricant tank. For example, it extends through an interior of the lubricant tank for at least 50%, at least 75% or more of the lubricant tank interior. In particular the lubricant line is arranged in the lubricant tank in such a way that its mouth opening facing away from the lubricant pump is always above a lubricant level occurring during normal operation of the drive unit. Accordingly, the lubricant can be Introduced into the lubricant tank particularly effectively.

It may be provided that the lubricant line extending from the end cover first passes through the partition wall delimiting the air space, before it reaches the lubricant tank. This means that the lubricant tank is arranged outside the air space, in particular separated from it. For example, the lubricant tank is separated from the machine housing itself, so that walls of the machine housing completely enclose a lubricant-retaining storage space of the lubricant tank. The lubricant tank can thus be connected to the lubricant pump in a particularly simple manner by way of the lubricant line. In particular, it is not necessary to form corresponding channels in the base body of the machine housing itself.

A further development of the invention provides that the end cover encloses at least in portions a receiving opening formed in the machine, wherein the machine shaft is arranged and/or mounted in the receiving opening. For example, the receiving opening is formed in the aforementioned partition wall, which delimits the air space. The machine shaft is preferably arranged or mounted in the receiving opening. The shape of the end cover is adapted to the receiving opening and surrounds it at least in certain areas. This means that at least some of the channels or their openings are at an identical distance from the receiving opening, but are positioned at different angles to it. In order to nevertheless cover or close the openings by means of the end cover, the end cover is adapted to the receiving opening. This results in an extremely efficient use of space.

The features and combinations of features described in the description, in particular the features and feature combinations described in the following description of the figures and/or shown in the figures can be used not only in the respective combination but also in other combinations or alone, without departing from the scope of the invention. Thus, embodiments are also to be regarded as included in the invention which are not explicitly shown or explained in the description and/or in the figures, but which emerge from the embodiments or can be derived from them.

BRIEF DESCRIPTION OF THE FIGURES

The invention is explained in more detail below with reference to the embodiments shown in the drawing, without limiting the invention. In particular.

DETAILED DESCRIPTION

Figure 1:
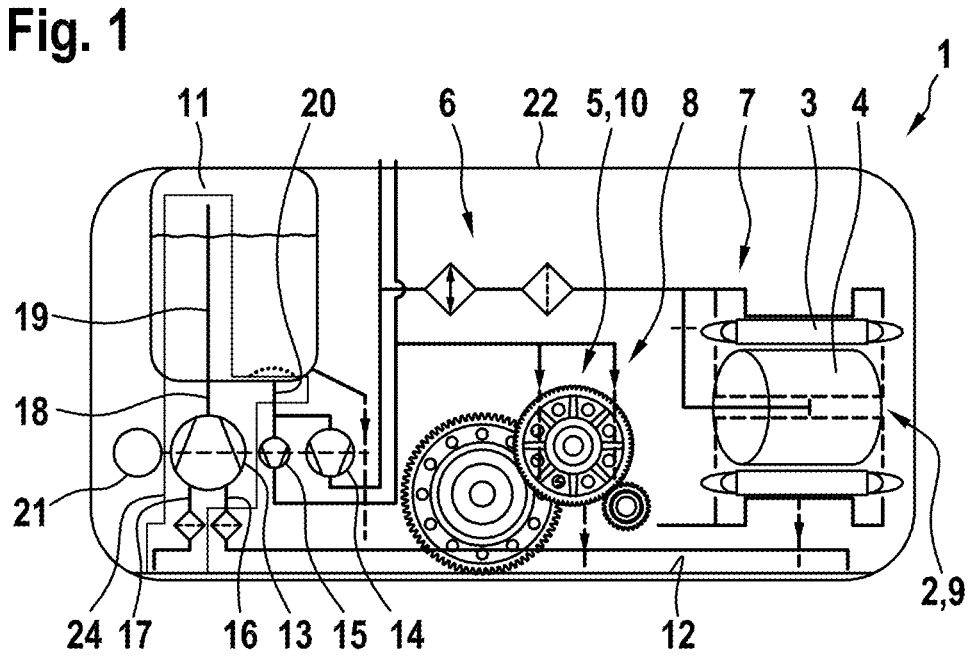
FIG. 1 shows a schematic representation of a drive device for a motor vehicle, with a machine housing in which a lubricant consumer, a lubricant tank and a lubricant pump are arranged.

FIG. 1 shows a schematic representation of a drive unit 1 for a motor vehicle not shown in detail. The drive unit 1 has a drive unit 2, which in the embodiment shown is in the form of an electric machine and accordingly has a stator 3 and a rotor 4. Furthermore, the drive unit 1 has a gearbox 5, which in the illustrated exemplary embodiment has several gear stages. Preferably, the drive unit 2 is connected to an output shaft via the gearbox 5 to an output shaft of the drive unit 1, wherein the output shaft can in turn be operatively coupled to at least one wheel of the motor vehicle. Both the drive unit 2 and the gearbox 5 are arranged in a machine housing 6 of the drive unit 1.

During operation of the drive unit 1, the drive unit 2 and the gearbox 5 are at least partially supplied with lubricant for lubrication and/or for temperature control. For this purpose, the drive unit 2 and the gearbox 5 have lubricant supply devices 7 and 8 respectively. In this respect, the drive unit 2 and the gearbox 5 represent a lubricant consumer 9 and a lubricant consumer 10. The lubricant consumers 9 and 10 are at least temporarily supplied with lubricant from a lubricant tank 11. The lubricant supplied to the lubricant consumers 9 and 10 enters a lubricant sump 12 after lubrication and/or temperature control and is pumped out of this by means of a lubricant pump again in the direction of the lubricant tank 11 by means of a lubricant pump 13. In the context of the exemplary embodiment described here, it is envisaged that the lubricant is supplied to the lubricant consumers 9 by means of a first further lubricant pump 14 and to the further lubricant consumer 10 by means of a second further lubricant pump 15.

The lubricant pump 13 is fluidically connected to the lubricant sump 12 via a suction channel 16 and a further suction channel 17 and thus to the lubricant consumers 9 and 10 namely on the suction side. On the pressure side, the lubricant pump 13 is connected via a pressure channel 18 and a lubricant line 19 to the lubricant tank 11. Finally a flow channel 20 is provided, via which the lubricant tank 11 is connected to lubricant consumers 9 and 10, namely via the other lubricant pumps 14 and 15. In the example shown here, the lubricant pump 13 and the other lubricant pumps 14 and 15 are driven by means of a common drive 21, which can also be referred to as a lubricant pump drive or oil pump drive. The drive 21 has, for example an electric motor or is designed as such.

It is intended that the suction channel 16, the further suction channel 17, the pressure channel 18 and the flow channel 20 are each formed in a base body 22 of the machine housing 6, which can also be referred to as the gearbox housing, namely each with the formation of an opening 23 not shown here. The openings 23 of the aforementioned channels 16, 17, 18 and 20 are covered or closed fluidically separately from each other by means of an end cover 24 attached to the base body 22, which is only indicated here.

Figure 2:
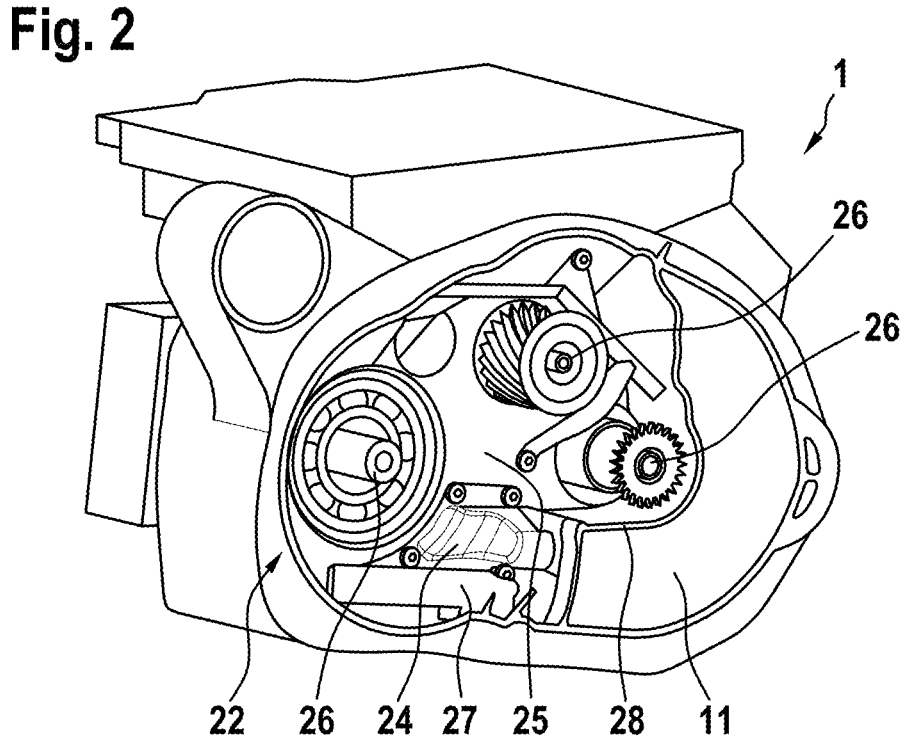
FIG. 2 shows a further schematic representation of the drive unit.

FIG. 2 shows another schematic representation of the drive unit 1. In particular, the base body 22, which includes an air space 25, can be recognized, namely together with a machine housing cover that is not shown here, which is attached to the base body 22. At least one machine shaft 26 engages in the air space 25, in the illustrated exemplary embodiment, several machine shafts 26. The end cover 24 attached to the base body 22 is also recognizable.

A suction nozzle 27 is arranged on the end cover 24, which nozzle is fluidically connected to the other suction channel 17 via the end cover 24. The suction nozzle 27 protrudes in the direction of a bottom of the machine housing 6 in the air space 25, so that lubricant present in the air space 25 can be supplied via the suction nozzle 27 through the further suction channel 17, the lubricant pump 13, the pressure channel 18 and the lubricant line 19 into the lubricant tank 11. The lubricant tank 11 is formed separate from the air space 25 in the machine housing 6 and, in the exemplary embodiment shown here, is separated from it by the partition wall 28.

Figure 3:
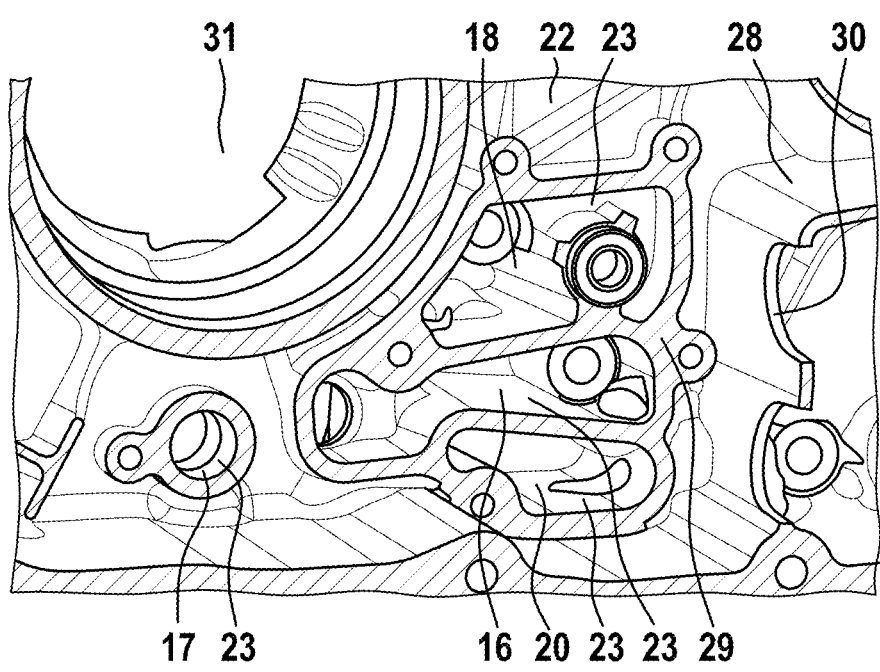
FIG. 3 shows a schematic detailed representation of a region of the drive device.

FIG. 3 shows a schematic detailed representation of a region of the machine housing 6 or the base body 22. The suction channels 16 and 17, the pressure channel 18, the flow channel 20 and the openings 23 are shown. It is clear that the openings 23 are delimited by edges 29, which are continuous in a common imaginary plane. After it has been attached to the base body 22, the end cover 24 lies sealingly against the edges 29, so that the openings 23 are each closed. The edges form, for example, a component of a flange on which the end cover 24 is arranged.

Also recognizable is a passage opening 30 that extends through the partition wall 28 and a receiving opening 31. After mounting the end cover 24, the lubricant line 19 passes through the opening 30 in order to fluidically connect the pressure channel 18 to the lubricant tank 11. The machine shaft 26 or one of the machine shafts 26 is arranged or mounted in the receiving opening 31.

Figure 4:
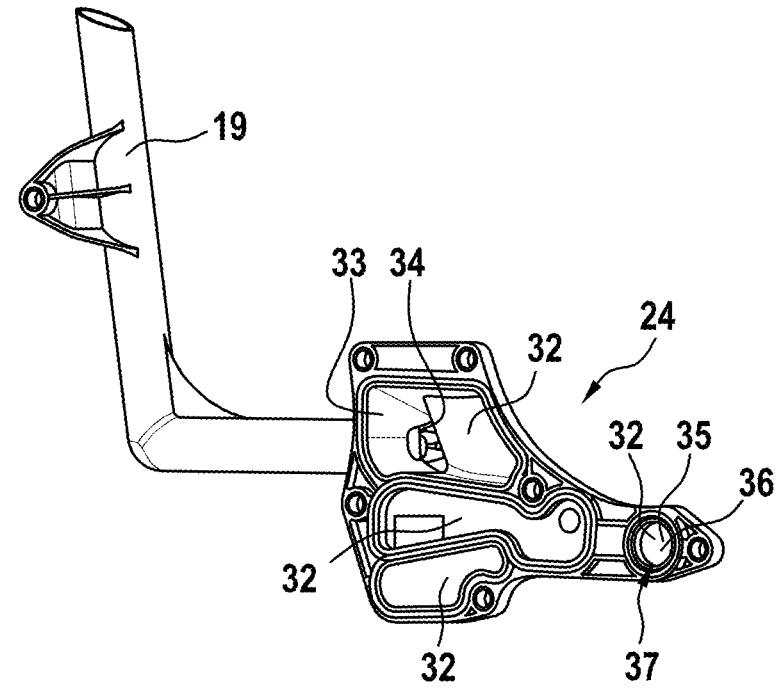
FIG. 4 shows an end cover of the machine housing and a lubricant line extending therefrom.

FIG. 4 shows a schematic representation of the end cover 24 and the lubricant line 19. It can be seen that the end cover 24 has several recesses 32, each of which overlaps one of the channels 16, 17, 18 and 20 and are in fluid connection with it through the respective opening 23. The recess 32 connected to the pressure channel 18 can also be referred to as a pressure chamber 33. It is fluidically connected to the lubricant line 19 via a connection opening 34.

The lubricant line 19 enters the pressure chamber 33 via the connection opening 34. Similarly, the recess 32 connected to the further suction channel 17 can be referred to as suction chamber 35. The suction chamber 35 is fluidically connected to the suction nozzle 27. A wall 36 of the suction nozzle is formed for the illustrated exemplary embodiment by an opening 37 formed in the end cover 24.

The design of the drive unit 1 described enables a particularly simple and cost-effective production of the described channels 16, 17, 18 and 20. Preferably, recesses are preferably formed during the casting of the machine housing 6 in the base body 22, which form the channels 16, 17, 20 and 22 at least in portions. These recesses or the corresponding openings 23 are subsequently covered or closed with the aid of the end cover 24. In this respect, the end cover 24 serves to simultaneously and fluidically separately cover or close of the openings 23.

LIST OF REFERENCE NUMERALS

1 drive unit
2 drive unit
3 stator
4 rotor
5 gearbox
6 machine housing
7 lubricant supply device
8 lubricant supply device
9 lubricant consumer
10 lubricant consumer
11 lubricant tank
12 lubricant sump
13 lubricant pump
14 first further lubricant pump
15 second further lubricant pump
16 suction channel
17 further suction channel
18 pressure channel
19 lubricant line
20 flow channel
21 drive
22 gearbox housing
23 opening
24 end cover
25 air space
26 machine shaft
27 suction nozzle
28 partition wall
29 edge
30 passage opening
31 recess opening
32 recess
33 pressure chamber
34 connection opening
35 suction chamber
36 wall
37 passage

The invention claimed is:

1. A drive device for a motor vehicle comprising a machine housing comprising:

a first lubricant consumer;
a lubricant tank; and a first lubricant pump having a suction side and a pressure side, wherein the first lubricant pump is fluidically connected:

on the suction side, via a first suction channel to the first lubricant consumer;

on the pressure side, via both a pressure channel and a lubricant line to the lubricant tank, wherein the pressure channel is connected to a pressure chamber and the lubricant line enters the pressure chamber via a connection opening; and on the suction side, parallel to the first suction channel to a second suction channel and to a second lubricant consumer, the first suction channel, the pressure channel, and a flow channel are each formed open with an opening in a base body of the machine housing, the openings of the first suction channel, the pressure channel, and the flow channel are covered, fluidically separate from one another, by an end cover attached to the base body, the end cover having an opening formed therein, an inner surface of the opening of the end cover forming at least a portion of a wall of a suction nozzle configured to supply lubricant from an air space of the machine housing, the air space being delimited by a wall of the base body and by a machine housing cover fixed to the base body and being sealed off from an environment in a fluid-tight manner, the suction nozzle being fluidically connected to the second suction channel, the lubricant tank is fluidically connected via the flow channel and a second lubricant pump to the first lubricant consumer and separated from the air space by a partition wall, the lubricant tank is fluidically connected via the flow channel and a third lubricant pump to a second lubricant consumer, and a common drive is configured to drive the first lubricant pump, the second lubricant pump, and the third lubricant pump.

2. The drive device according to claim 1, wherein the first lubricant consumer and the second lubricant consumer are each present as one of the following devices:

a drive unit and a gearbox.

3. The drive device according to claim 2, wherein the first suction channel is fluidically connected via a lubricant sump to the first lubricant consumer and the second suction channel is fluidically connected via the lubricant sump to the second lubricant consumer.

4. The drive device according to claim 2, wherein the end cover for covering the openings rests against edges delimiting the openings, which edges lie completely in an imaginary plane.

5. The drive device according to claim 2, wherein the end cover consists of a material which is different from a material of the base body of the machine housing.

6. The drive device according to claim 1, wherein the first suction channel is fluidically connected via a lubricant sump to the first lubricant consumer and the second suction channel is fluidically connected via the lubricant sump to the second lubricant consumer.

7. The drive device according to claim 6, wherein the end cover for covering the openings rests against edges delimiting the openings, which edges lie completely in an imaginary plane.

8. The drive device according to claim 6, wherein the end cover consists of a material which is different from a material of the base body of the machine housing.

9. The drive device according to claim 1, wherein the end cover for covering the openings rests against edges delimiting the openings, which edges lie completely in an imaginary plane.

10. The drive device according to claim 9, wherein the end cover consists of a material which is different from a material of the base body of the machine housing.

11. The drive device according to claim 1, wherein the end cover consists of a material which is different from a material of the base body of the machine housing.

12. The drive device according to claim 1, wherein the first lubricant pump is fluidically connected to the lubricant tank via the pressure channel formed in the base body and the connection opening, a suction chamber of the end cover is fluidically connected via the corresponding opening to the first suction channel, and the second suction channel is fluidically connected via a passage opening to the lubricant tank, so that the first lubricant pump is fluidically connected via the first suction channel formed in the base body and the passage opening to the first lubricant consumer.

13. The drive device according to claim 1, wherein the end cover is arranged in the air space and at least one machine shaft of the drive device protrudes into the air space.

14. The drive device according to claim 1, wherein a connection opening is fluidically connected via the lubricant line attached to the end cover to the lubricant tank, wherein the lubricant line extends through a passage opening in the partition wall delimiting the air space and extends partially through the lubricant tank.

15. The drive device according to claim 1, wherein the end cover encloses, at least in portions, a receiving opening formed in the machine housing, and a machine shaft is arranged and/or mounted in the receiving opening.

16. The drive device according to claim 1, wherein the first lubricant consumer and the second lubricant consumer are each present as one of the following devices:

a drive unit and a gearbox.

17. The drive device according to claim 1, wherein the first suction channel is fluidically connected via a lubricant sump to the first lubricant consumer and the second suction channel is fluidically connected via the lubricant sump to the second lubricant consumer.

18. The drive device according to claim 1, wherein the end cover for covering the openings rests against edges delimiting the openings, which edges lie completely in an imaginary plane.

19. The drive device according to claim 1, wherein the end cover consists of a material which is different from a material of the base body of the machine housing.

* * * * *